United States Patent Office 2,819,308
Patented Jan. 7, 1958

2,819,308
VITAMIN A-ACTIVE MATERIAL

Kurt H. Schaaf, Newark, N. J., Howard C. Klein, Brooklyn, N. Y., and Roland Kapp, East Orange, N. J., assignors to Nopco Chemical Company, Harrison, N. J., a corporation of New Jersey No Drawing. Application November 4, 1955
Serial No. 545,125

7 Claims. (Cl. 260—563)

This invention relates to vitamin A and more particularly to a new compound and a process for producing it, which compound is useful for the production of vitamin A. This application is a continuation-in-part of our co-pending application Serial No. 449,792, filed August 13, 1954, and now abandoned.

It is known that vitamin A ethers and vitamin A esters can be prepared by treating either the cis or the trans form of a material having the empirical formula $C_{20}H_{30}O$ which compound contains the beta ionone ring structure, four ethylenic bonds and one hydroxyl group, and which in the trans configuration has an absorption maximum in the ultra-violet at 2710 A., a molecular extinction coefficient at that wave length of 29,100 and has a refractive index at 20° C. of about 1.552, and which in the cis configuration has an absorption maximum in the ultra-violet at 2740 A., a molecular extinction coefficient at that wave length of 25,900 and has a refractive index at 16° C. of about 1.535 (referred to hereinafter as Compound I) with boron trifluoride etherate in the presence of an alcohol if a vitamin A ether is desired and in the presence of an organic acid if a vitamin A ester is desired.

The trans form of Compound I may be prepared by reacting lithium aluminum hydride with a compound having the empirical formula $C_{20}H_{28}O$ which contains the beta ionone ring structure, three ethylenic bonds, one acetylenic bond, and one hydroxyl group, and which has a refractive index at 21° C. of 1.5548 and an absorption maximum at 2670 A. in the ultra-violet with a molecular extinction coefficient at this wave length of 23,800 (this compound is referred to hereinafter as Compound II). The cis form of Compound I is obtained by catalytic hydrogenation of Compound II using hydrogen and a metallic hydrogenation catalyst.

Compound II can be prepared by reacting beta ionone with the Grignard reagent of a compound having the empirical formula $C_7H_8$ and which contains one acetylenic and two ethylenic bonds and which has a refractive index at 17° C. of 1.5158, and absorption maximum in the ultra-violet at 2590 A. with a molecular extinction coefficient at that wave length of 21,500 and distills at 53–54° C. at 90 millimeters of mercury pressure (this compound is referred to hereafter as Compound III), and then hydrolyzing the reaction product to yield the desired Compound II.

Compounds I, II and III have the following structural formulas:

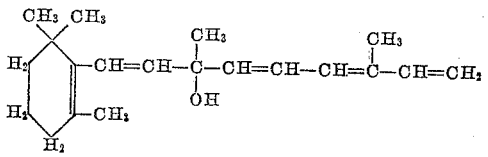

Compound I

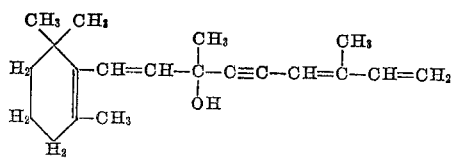

Compound II

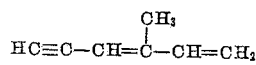

Compound III

U. S. Patent No. 2,587,457 discloses a process for producing vitamin A. It is stated in the patent that compounds which are believed by the patentee to have the structural formula which we believe Compounds I, II and III have are employed in the process of the patent. However, the compounds employed in the process of the patent are not the same as the compounds which we employ since spectrographic data which are given by the patentee for his compounds are considerably different from the spectrographic data for the compounds which we employ. Thus the patentee's compound which is stated to have the same structural formula as we believe Compound III has is stated in the patent to have an absorption maximum in the ultra-violet of 2370 A. whereas Compound III has an absorption maximum of 2590 A. Likewise, the compound referred to in the patent as having the same structure as our Compound II is stated by the patentee to have an absorption maximum in the ultra-violet of 2840–2860 A. whereas Compound II has an absorption maximum in the ultra-violet of 2670 A. The patentee does not give any spectrographic data for the compound which he states has a structural formula corresponding to the formula which we believe Compound I has. Since, however, the patentee produces that compound by reducing to a double bond the triple bond in a compound having far different spectrographic characteristics than our Compound II and since we produce Compound I by reducing to a double bond the triple bond in Compound II, our Compound I cannot be the same as the compound the patentee asserts has the same structure as our Compound I. Further proof that his compound which is stated to have the same structural formula as we believe our Compound I to have cannot be the same as Compound I is furnished by the fact that Compound I when treated in accordance with the procedures set forth in the patent does not produce vitamin A or vitamin A ethers or esters to the extent stated by the patentee and, in fact, in many cases no vitamin A or vitamin A derivative whatever is produced by treating Compound I in the manner in which the patentee states that he obtains vitamin A compounds.

Although it is possible to produce small yields of vitamin A ethers and vitamin A esters by treating Compound I with boron trifluoride etherate in the manner referred to above, it is not possible to produce vitamin A alcohol directly by treating Compound I with boron trifluoride etherate, at least not in any significant amount. Furthermore, the yields of vitamin A esters which can be produced by this method are relatively low and, therefore, it is not feasible to produce vitamin A alcohol by first producing a vitamin A ester by this method and then converting it to the alcohol. It would be highly desirable to produce vitamin A alcohol in good yields directly from Compound I; and in our copending application Serial No. 449,792 referred to above, we disclosed a process which we believed to produce vitamin A alcohol directly from Compound I. We have now found, however, that the compound produced by that process is not vitamin A alcohol although it does have vitamin A activity and does have ultra-violet spectrographic characteristics which are practically identical with those of vitamin A alcohol. This compound is quite useful, however, as an intermediate for use in producing vitamin A and other related compounds as will be more fully pointed out hereinafter.

It is the object of this invention to provide a new compound which has vitamin A activity and which is useful as an intermediate for producing vitamin A.

A further object of the invention is to provide a new procedure for producing a compound which is useful for producing vitamin A.

Other objects of the invention will in part be obvious and will in part appear hereinafter.

We have discovered that a new compound (referred to hereafter as Compound IV) useful in the production of vitamin A may be readily produced in excellent yields from Compound I by reacting either the cis or the trans form of Compound I with boron trifluoride hexamethylene tetramine complex under appropriate reaction conditions in a water-containing aromatic hydrocarbon solvent solution.

The reaction is carried out in an aromatic hydrocarbon solvent solution with solvents such as benzene, toluene, xylene, methyl isopropyl benzene, isopropyl benzene, ethyl benzene, diethyl benzene, mesitylene, butyl benzene, amyl benzene, etc. and similar aromatic hydrocarbon solvents all being highly suitable as the reaction medium. These hydrocarbon solvents are substantially water-immiscible but they will dissolve a small percentage of water.

The hexamethylene tetramine complex of boron trifluoride which we employ is one in which the ratio of boron trifluoride to hexamethylene tetramine varies from an average of about 1.5 to an average of about 2.5 molecules of boron trifluoride to each molecule of hexamethylene tetramine. Complexes containing larger or smaller ratios of boron trifluoride are not nearly as satisfactory for use in our process as complexes containing our preferred ratios. Preferably we employ a complex containing an average of about 2 molecules of boron trifluoride for each molecule of hexamethylene tetramine. In carrying out the reaction we have found that the boron trifluoride complex does not act in the normal catalytic sense. Thus in order to obtain the most satisfactory results when using a complex containing about 2 molecules of boron trifluoride for each molecule of hexamethylene tetramine, it is necessary that the boron trifluoride complex be employed in at least about a mole to mole ratio in proportion to the amount of Compound I which is used in the reaction. Although ratios of less than one to one will produce some Compound IV, by far the best results are obtained when at least about a one to one ratio is employed. Ratios greater than one to one can be used, if desired, but normally there is no substantial advantage in using such higher ratios. When the ratio of boron trifluoride to hexamethylene tetramine in the complex is decreased, the mole ratio of the complex to Compound I is preferably increased a corresponding amount. Also when the ratio of boron trifluoride to hexamethylene tetramine in the complex is increased, the mole ratio of the complex to Compound I can be correspondingly decreased, if desired, although it is not necessary to do so.

Since Compound I and Compound IV are relatively susceptible to oxidation, it is preferred that the reaction be carried out in an inert atmosphere such as an atmosphere of nitrogen, helium or some other inert gas. Preferably carbon dioxide is not employed since it might detrimentally affect the acid balance of the reaction mixture.

The temperature at which the reaction is carried out can be varied. Preferably, however, the temperature should be between about room temperature and about 35° C. and, if desired, higher temperatures can be employed. We have found that at room temperature the reaction will normally proceed to completion in about 40 hours. Naturally, at higher temperatures the reaction time will be considerably reduced.

Since polar solvents such as water react with boron trifluoride, it might be thought that the presence of water in the reaction mixture would inactivate the boron trifluoride hexamethylene tetramine complex. We have found, however, that under the reaction conditions which we employ water does not inactivate the complex. The ratio of water which we employ in comparison to the amount of Compound I can readily be varied by varying the concentration of Compound I in the reaction mixture or by using an aromatic hydrocarbon solvent which is not completely saturated with water. Preferably at least about 1 mole of water for each 5 moles of Compound I is used, and preferably not more than about 4 moles of water for each mole of Compound I are employed.

Preferably we employ rather dilute solutions of Compound I in carrying out the conversion of Compound I to Compound IV. Thus in most cases a concentration of from about 0.1 to about 1 g. of Compound I is present for each 100 ml. of the aromatic hydrocarbon solvent solution.

As stated above, Compound IV does have vitamin A activity. When tested biologically on rats, Compound IV shows a vitamin A activity of about 50%. Also as pointed out above, the ultra-violet spectrographic characteristics of Compound IV are practically identical with those of vitamin A. However, the infra-red spectrographic data of Compound IV show that Compound IV does not contain a hydroxyl group; however, the infra-red spectrographic curve does contain an N—H stretching band indicating the presence of either a primary or a secondary amino group in Compound IV. However, Compound IV is different than the vitamin A amine (referred to hereafter as vitamin A amine) wherein the amine group has replaced the hydroxyl group of vitamin A since analysis of Compound IV by the Kjeldahl method shows a nitrogen content of about twice the nitrogen content of vitamin A amine, i. e., about 9.6%. Therefore, Compound IV is not vitamin A amine. Further evidence that Compound IV is not vitamin A amine is the fact that diazotization experiments on Compound IV using diazotizing agents such as dilute acetic acid and sodium nitrite, dilute acetic acid and isoamyl nitrite, and 1 N hydrochloric acid and sodium nitrite failed to convert Compound IV to vitamin A alcohol and instead Compound IV was recovered unchanged.

As yet the structure of Compound IV has not been determined but its physical and chemical characteristics indicate that it contains the vitamin A chromophoric system wherein the hydroxyl group of vitamin A has been replaced by a basic fragment similar to a major portion of the hexamethylene tetramine molecule.

Compound IV is a viscous liquid soluble in ethyl ether, ethyl alcohol, acetone and similar solvents. It has an absorption maximum in the ultra-violet at 3250 A., and has at that wave length an extinction coefficient of about 1000. If Compound IV is treated with hydrobromic acid, the resulting product has an absorption maximum at 3300 A. Likewise treatment of Compound IV with phosphoric acid gives a product having an absorption maximum at 3280–3300 A. Presumably salts of Compound IV are formed by the treatments with hydrobromic and phosphoric acids since treatment of the products with alkali gives in each case the original Compound IV having an absorption maximum at 3250 A. Acetylation of Compound IV with acetic anhydride gives a product which when analyzed by infra-red analysis shows the presence of an amide band in the infra-red spectrographic curve.

Compound IV can be converted to vitamin A amine by treating Compound IV with aluminum isopropoxide in accordance with the procedure disclosed and claimed in the copending application Serial No. 545,124 of Howard C. Klein, filed concurrently herewith. Also Compound IV can be converted to vitamin A aldehyde by treating Compound IV with iodine in accordance with the procedure disclosed and claimed in the copending application of Howard C. Klein and Davide R. Grassetti, Serial No. 545,122, filed concurrently herewith.

On completion of the reaction between Compound I, and the boron trifluoride hexamethylene tetramine complex, there is added to the reaction mixture an excess of an organic or inorganic basic material, i. e., an amount sufficient to react with all of the boron trifluoride in the reaction mixture. The basic material can be added in an aqueous solution or an alcoholic solution or by any other suitable means. Bases such as ammonia, sodium hydroxide, potassium hydroxide, trimethylamine, ethanolamine and similar inorganic or organic bases may be employed. The type or nature of the basic material which is added is not critical except that it must be capable of displacing the hexamethylene tetramine from the boron trifluoride hexamethylene tetramine complex. Preferably a basic material whose dissociation constant is greater than that of hexamethylene tetramine is employed. The basic material is added in order to separate the boron trifluoride from the product produced by the reaction of Compound I with the boron trifluoride hexamethylene tetramine complex. After the treatment of the reaction mixture with the basic material, Compound IV is present in the reaction mixture free of the boron trifluoride. Compound IV may then be readily recovered from the reaction mixture by any suitable means, for example, if the basic material was added in an aqueous solution, extraction of the reaction mixture with hexane will remove the Compound IV from the reaction mixture in pure form. Compound IV can then be obtained by evaporation of the hexane extracts. If desired the reaction mixture can be washed with an aqueous solution of a basic material until the reaction mixture is free of boron trifluoride, and then the reaction mixture can be evaporated to dryness to give the Compound IV.

For a fuller understanding of the invention reference may be had to the following examples which are given merely as further illustrations of the invention and are not to be construed in a limiting sense:

Example I

A mixture of 0.110 g. of the trans form of Compound I, 0.170 g. of anhydrous boron trifluoride hexamethylene tetramine complex containing an average of about 2 molecules of boron trifluoride for each molecule of hexamethylene tetramine, 12.5 ml. of anhydrous toluene, and 12.5 ml. of water-saturated toluene (containing 0.024% of water as determined by the Karl Fischer moisture determination) was shaken at room temperature in an atmosphere of nitrogen. On completion of the reaction, methanolic ammonia was added to the reaction mixture in an amount sufficient to react with all of the boron trifluoride present in the reaction mixture. Thereafter the reaction mixture was evaporated to dryness, the residue taken up in hexane and the hexane solution evaporated to dryness to insure complete removal of the toluene since toluene would interfere with the spectroscopic analysis. The final residue was then dissolved in isopropanol for spectroscopic analysis. The ammonium salt of the boron trifluoride was not separated from the Compound IV in this example since it does not interfere with the spectroscopic analysis. After 41 hours Compound IV had been formed in a yield of 31.8% as indicated by ultraviolet spectroscopic analysis.

Example II

A mixture of 0.110 g. of the trans form of Compound I, 0.209 g. of anhydrous boron trifluoride hexamethylene tetramine complex containing an average of about 2 molecules of boron trifluoride for each molecule of hexamethylene tetramine, 18.75 ml. of anhydrous toluene, and 6.25 ml. of water-saturated toluene was shaken at room temperature in an atmosphere of nitrogen. After 41 hours Compound IV had been formed in a 29.1% yield.

Example III

A mixture of 0.110 g. of trans form of Compound I, 0.129 g. of anhydrous boron trifluoride hexamethylene tetramine complex containing an average of about 2 molecules of boron trifluoride for each molecule of hexamethylene tetramine, and 25 ml. of water-saturated toluene was shaken at room temperature in an atmosphere of nitrogen. After 65 hours Compound IV had been formed in a 27.7% yield.

Since the ultra-violet absorption maximum for Compound I is at 2710 A. for the trans form of Compound I and at 2740 A. for the cis form of Compound I whereas the ultra-violet absorption maximum for Compound IV is at 3250 A., the course of the reaction can readily be followed by ultra-violet spectrographic analysis. Thus as the reaction proceeds the absorption peak at 3250 A. will gradually increase and at the same time the absorption peak at 2710 A. or 2740 A., depending on whether the trans or cis form of Compound I has been employed, will gradually diminish and on completion of the reaction will disappear. Thus it can readily be determined how long a reaction time will be required for any given set of reaction conditions.

Having described our invention what we claim as new and desire to secure by Letters Patent is:

1. A process for producing vitamin A active material which comprises the steps of reacting at a temperature between about room temperature and 35° C. a boron trifluoride hexamethylene tetramine complex containing an average of about 1.5 to about 2.5 molecules of boron trifluoride for each molecule of hexamethylene tetramine with an organic compound having the structural formula:

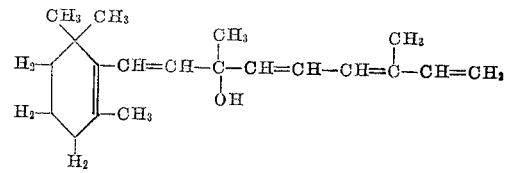

which compound contains the beta-ionone ring structure, four ethylenic bonds and one hydroxyl group and which in the trans form has an absorption maximum in the ultra-violet at 2710 A., a molecular extinction coefficient at that wave length of 29,100 and has a refractive index at 20° C., of about 1.552 and which in the cis form has an absorption maximum in the ultra-violet at 2740 A., a molecular extinction coefficient at that wave length of 25,900 and has a refractive index at 16° C. of about 1.535, said boron trifluoride hexamethylene tetramine complex being employed in an amount sufficient to provide at least about 2 molecules of boron trifluoride for each molecule of said organic compound, said reaction being carried out in a water containing aromatic hydrocarbon solvent, there being present a molar ratio of water to said organic compound of from about 1 to 5 to about 4 to 1, and thereafter adding to the reaction mixture an amount of an alkaline material sufficient to react with all of the boron trifluoride in the reaction mixture.

2. The process of claim 1 wherein the aromatic hydrocarbon solvent is selected from the group consisting of benzene, toluene, xylene, methyl isopropyl benzene, isopropyl benzene, ethyl benzene, diethyl benzene, Mesitylene, butyl benzene and amyl benzene.

3. The process of claim 1 wherein the aromatic hydrocarbon solvent is toluene.

4. The process of claim 1 wherein the concentration in the aromatic hydrocarbon solvent of the organic compound having the empirical formula $C_{20}H_{30}O$ varies from about 0.1 g. to about 1 g. for each 100 ml. of solvent.

5. The process of claim 4 wherein the aromatic hydrocarbon solvent is selected from the group consisting of benzene, toluene, xylene, methyl isopropyl benzene, isopropyl benzene, ethyl benzene, diethyl benzene, mesitylene, butyl benzene and amyl benzene.

6. The process of claim 5 wherein the boron trifluoride hexamethylene tetramine complex contains an average of about 2 molecules of boron trifluoride for each molecule of hexamethylene tetramine.

7. A compound having the following characteristics: (1) vitamin A activity, (2) an absorption maximum in the ultra-violet region of the spectrum at 3250 A. and an extinction coefficient thereat of about 1000, (3) an infra red pattern having the characteristic amine band, (4) when treated with hydrobromic acid, gives a product having an absorption maximum in the ultra-violet region of the spectrum at 3300 A., (5) when treated with phosphoric acid gives a product having an absorption maximum in the ultra-violet region of the spectrum of 3280–3300 A., (6) contains the vitamin A chromophoric system, (7) contains a hexamethylene tetramine fragment, (8) has a Kjeldahl nitrogen content of about 9.6%, (9) when treated with acetic anhydride gives a product which shows an amide band when subjected to infra-red analysis, (10) when treated with iodine is converted to vitamin A aldehyde and (11) when treated with aluminum isopropoxide is converted to vitamin A amine.

References Cited in the file of this patent

UNITED STATES PATENTS

| | | |
|---|---|---|
| 2,415,834 | Milas | Feb. 18, 1947 |
| 2,483,347 | Milas | Sept. 27, 1949 |
| 2,507,802 | Milas | May 16, 1950 |
| 2,583,194 | Weisler | Jan. 22, 1952 |
| 2,736,746 | Goldberg et al. | Feb. 28, 1956 |
| 2,744,137 | Grewe | May 1, 1956 |

FOREIGN PATENTS

| | | |
|---|---|---|
| 471,786 | Canada | Feb. 27, 1951 |